US007104412B2

(12) United States Patent
Yong

(10) Patent No.: US 7,104,412 B2
(45) Date of Patent: Sep. 12, 2006

(54) CLOTHES DRYING RACK

(76) Inventor: Teng Long Yong, 461 Macpherson Road, 368179 Singapore (SG)

( * ) Notice: Subject to any disclaimer, the term of this patent is extended or adjusted under 35 U.S.C. 154(b) by 0 days.

(21) Appl. No.: 10/488,503

(22) PCT Filed: Jul. 1, 2002

(86) PCT No.: PCT/SG02/00146

§ 371 (c)(1),
(2), (4) Date: Sep. 27, 2004

(87) PCT Pub. No.: WO03/093564

PCT Pub. Date: Nov. 13, 2003

(65) Prior Publication Data

US 2005/0029213 A1 Feb. 10, 2005

(30) Foreign Application Priority Data

Apr. 16, 2002 (SG) ................................. 200202194

(51) Int. Cl.
*A47F 7/24* (2006.01)
(52) U.S. Cl. .................. 211/206; 211/204; 211/123; 211/85.3; 211/189; 403/294; 403/258; 403/260; 280/79.3
(58) Field of Classification Search ............... 211/189, 211/206; 312/213; 403/294, 258, 260
See application file for complete search history.

(56) References Cited

U.S. PATENT DOCUMENTS

| 2,535,233 | A | * | 12/1950 | Ross ........................... 206/290 |
| 4,112,525 | A | * | 9/1978 | Roberts ........................ 4/559 |
| 4,476,606 | A | * | 10/1984 | Bjorkman et al. ............. 15/268 |
| 5,102,254 | A | * | 4/1992 | Yeh .............................. 403/174 |
| 6,488,160 | B1 | * | 12/2002 | Wang ........................... 211/195 |
| 2002/0005389 | A1 | * | 1/2002 | Guo ............................. 211/85.3 |

FOREIGN PATENT DOCUMENTS

CN  2130836 Y  4/1993
JP  7-027114  1/1995

OTHER PUBLICATIONS

Yong, Teng Long—Chinese Office Action dated Dec. 3, 2004 for Application No. 02131420.9 Filed Oct. 10, 2002.

* cited by examiner

*Primary Examiner*—Richard E. Chilcot, Jr.
*Assistant Examiner*—Jared W. Newton
(74) *Attorney, Agent, or Firm*—Nixon Peabody LLP; Jeffrey L. Costellia

(57) ABSTRACT

A clothes drying rack including a free standing frame that supports a plurality of rods from which articles of clothing can be suspended. Specifically, the clothes drying rack includes a plurality of rods wherein each rod has corrugated exterior to facilitate passage of air between the clothing and the rod.

7 Claims, 5 Drawing Sheets

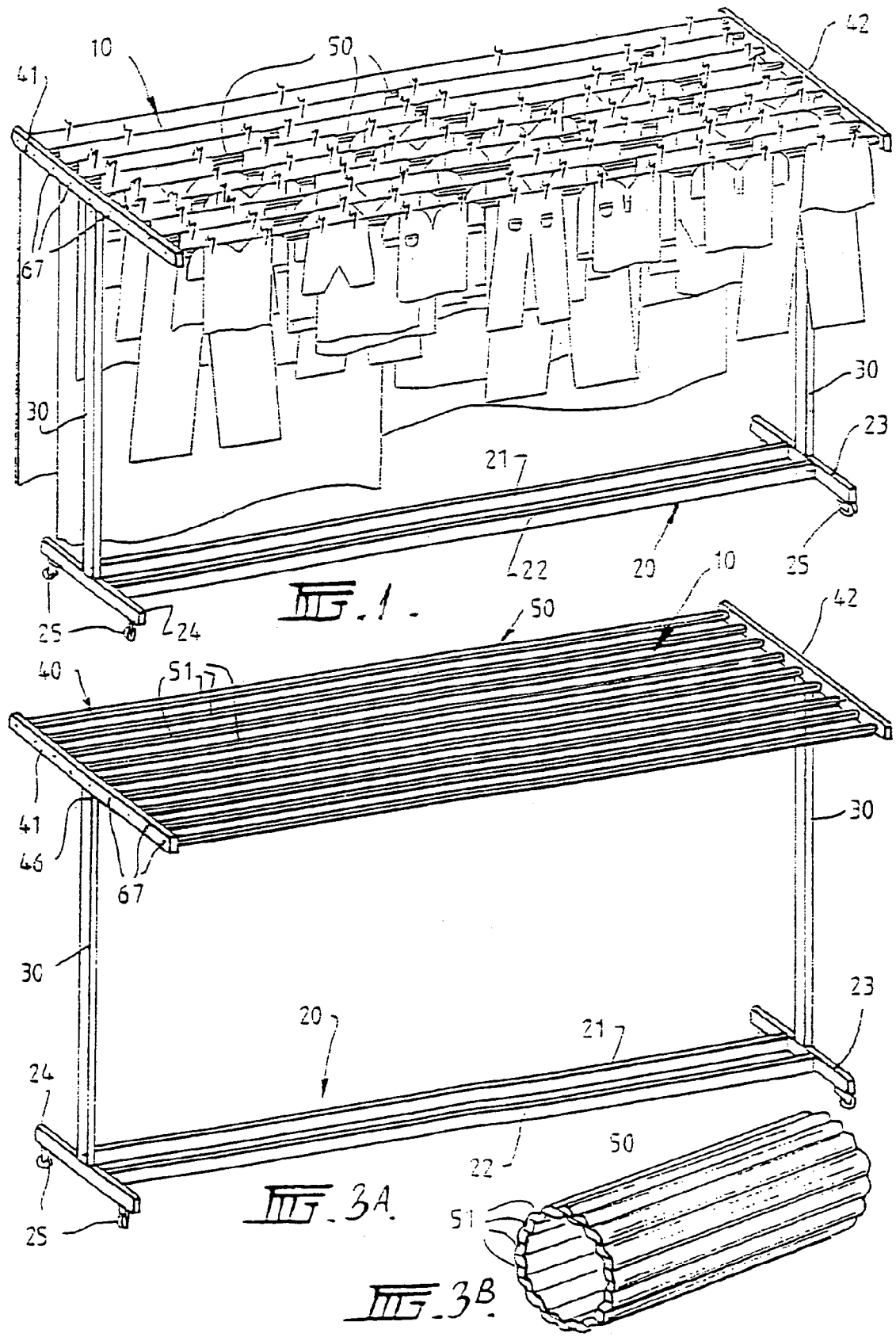

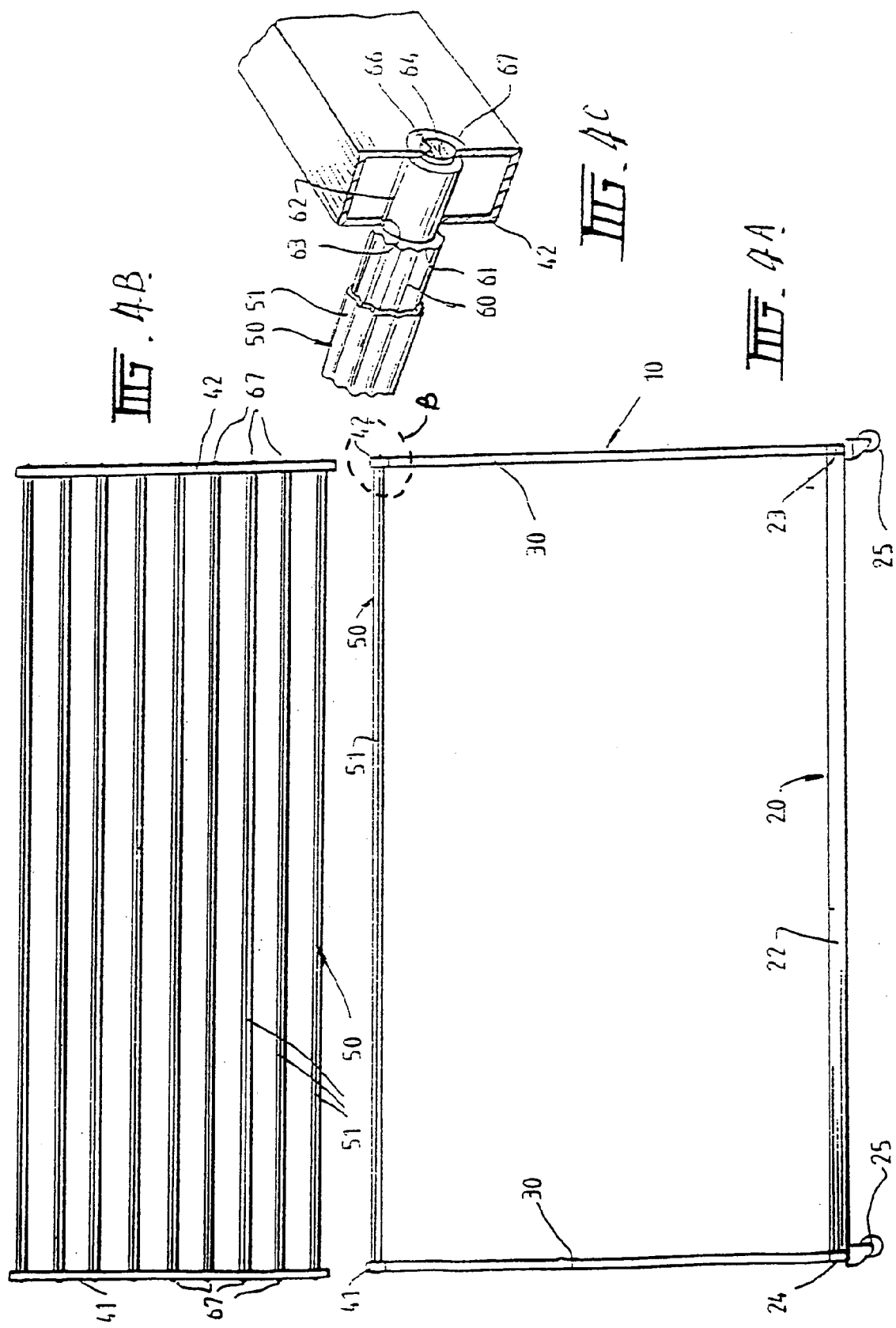

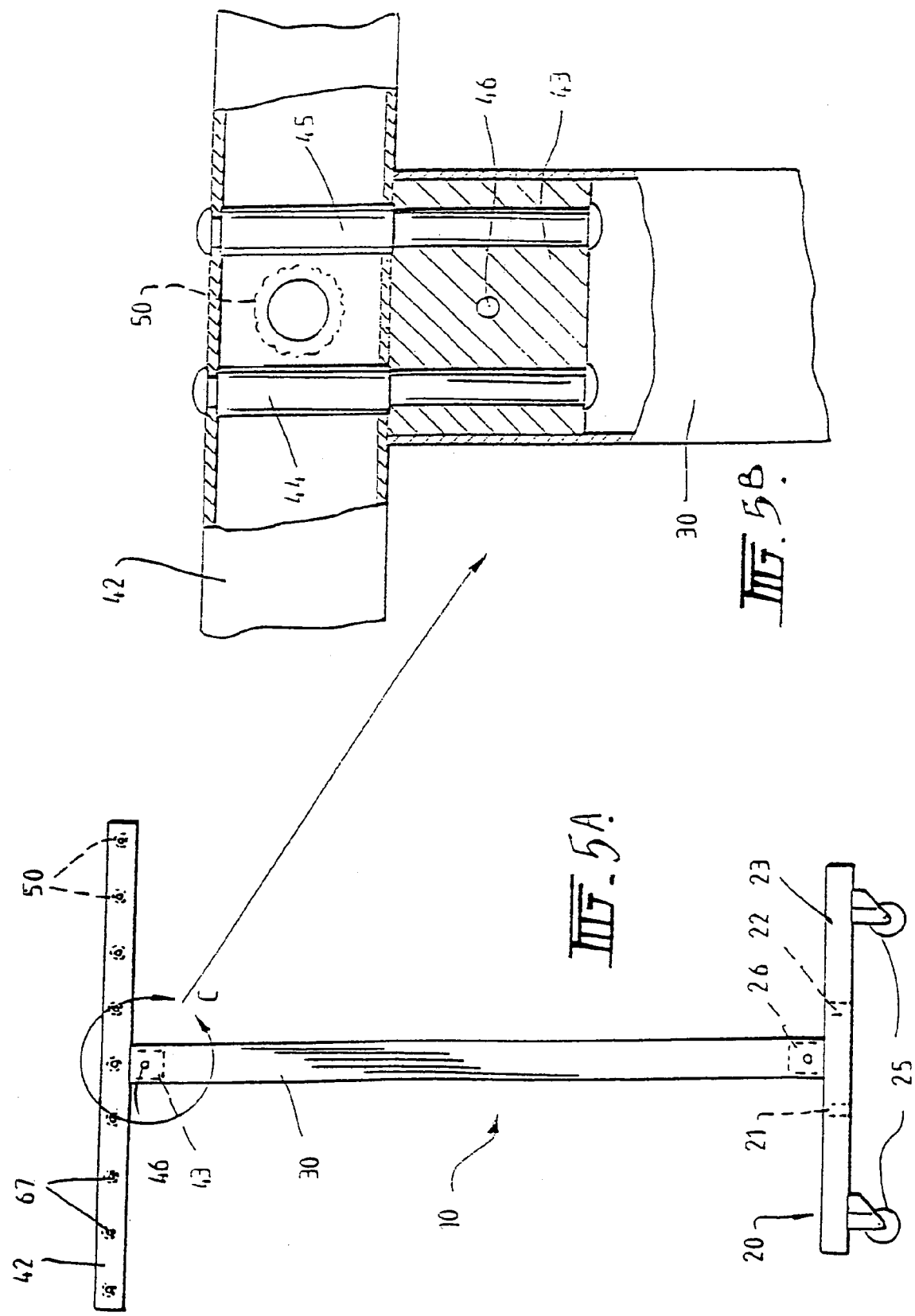

CLOTHES DRYING RACK

FIELD OF THE INVENTION

This invention relates to a clothing rack that can be used for drying clothes.

BACKGROUND OF THE INVENTION

It is common practice to dry clothes by exposing the recently washed clothes to the atmosphere preferably outdoors. Clothes lines of various types have been proposed from which the garments are suspended, usually by use of clothes pegs. There have also been proposals for portable racks from which the clothes can be suspended. Racks have the advantage that they take up less room than a clothes line and can be used in an indoor environment.

It is considered that there is a need to improve the versatility of a clothing rack by means of increasing its manoeuvrability, rending the rack easy to assemble and disassemble and ensuring good drying efficiency. The rack should be easy to use and durable, capable of resisting damage due to moisture and exposure to sunlight.

It is these issues that have brought about the present invention.

SUMMARY OF THE INVENTION

In accordance with the present invention, there is provided a clothing rack comprising a free standing frame that supports a plurality of rods from which clothing can be suspended, characterised in that each rod has a corrugated exterior to facilitate passage of air between the clothing and the rod.

DESCRIPTION OF THE DRAWINGS

An embodiment of the present invention will now be described by way of example only with reference to the accompanying drawings in which:

FIG. 1 is the perspective view of a clothing rack in accordance with the present invention supporting an array of clothing, FIG. 3A is a perspective view of the clothing rack, FIG. 3B is an enlarged view of a corrugated rod that forms part of the rack, FIG. 4A is a side elevation of the rack, FIG. 4B is a plan view of the rack, FIG. 4C is an enlarged cross-section view of the area inside circle B of FIG. 4A, FIG. 5A is an end elevation of the rack, FIG. 5B has an enlarged cross-sectional view of the area inside the circle C of FIG. 5A.

DESCRIPTION OF THE PREFERRED EMBODIMENT

Figure 2A:
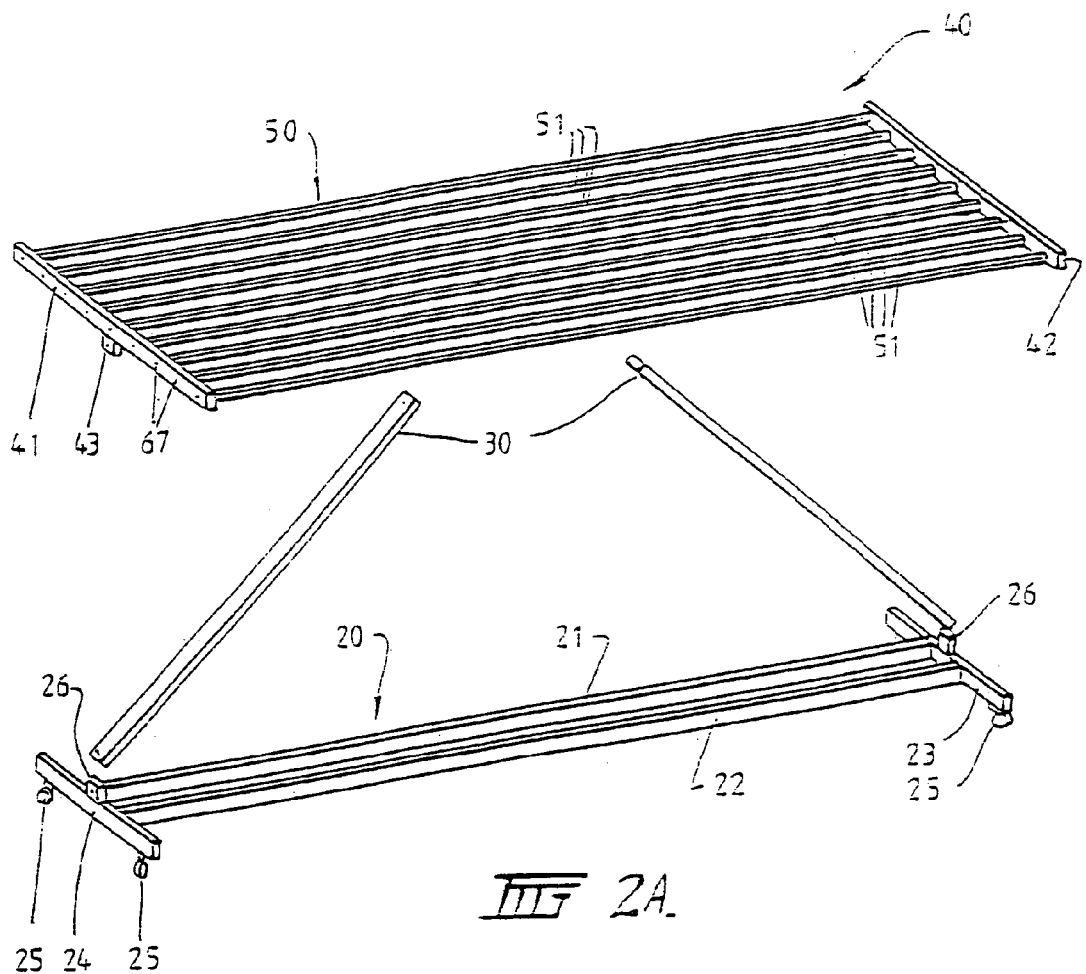
FIGS. 2A and 2B are perspective views of the clothing rack in a partially collapsed and collapsed configuration.
Figure 2B:
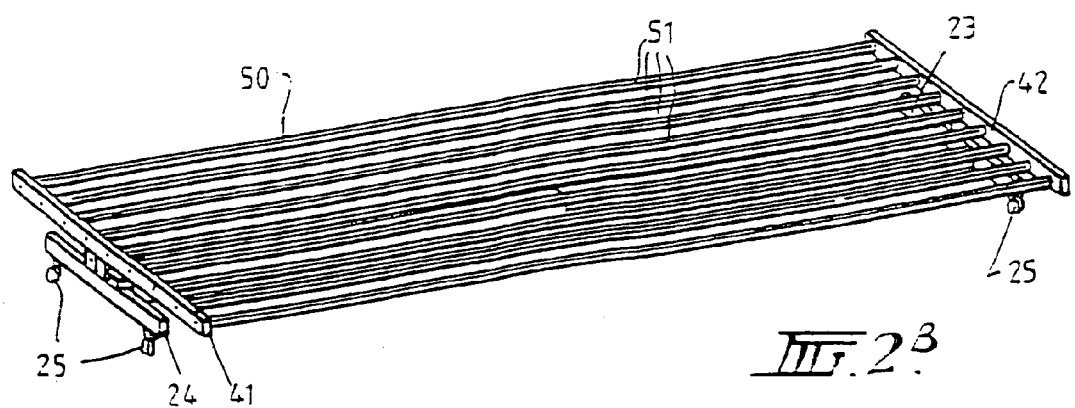
Figure 6B:
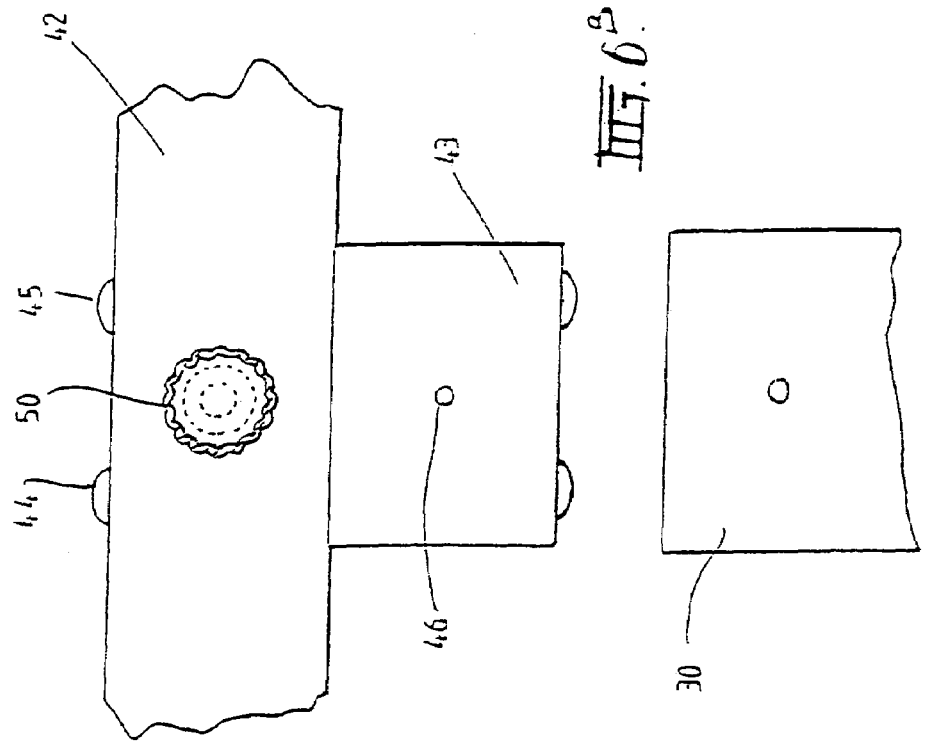
FIG. 6B is an enlarged view of the area within the circle D of FIG. 6A.
Figure 6A:
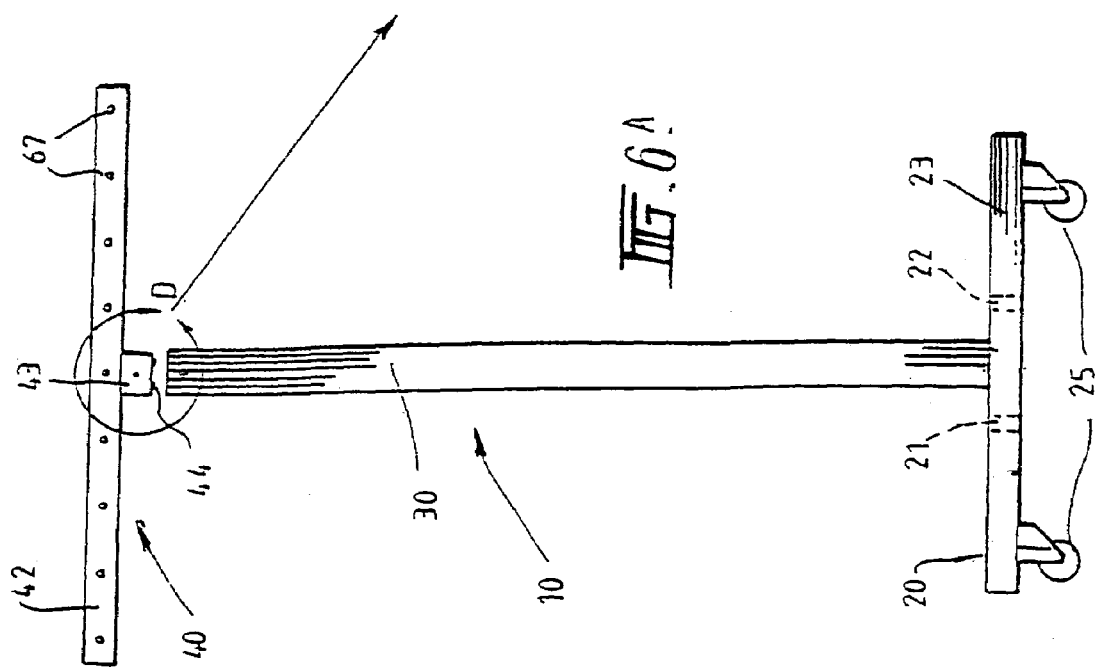
FIG. 6A is an end elevation of the rack.

The clothing rack 10 illustrated in the accompanying drawings essentially comprises a series of metal frame members 20, 30 & 40 that support nine equally spaced parallel rods 50 from which clothing can be suspended as shown in FIG. 1. The frame members include a lower frame member 20, a pair of vertical columns 30 and two horizontal upper frame members 40 that support the rods 50. As shown in FIG. 3B the rods 50 having longitudinal corrugations 51. The vertical columns 30 can be detached from the upper and lower frame members 40, 20 to allow the clothing rack 10 to assume a disassembled configuration as shown in FIG. 2B where the upper frame member 40 and lower frame member 20 are placed in abutting parallel contact with the vertical columns 30 extending horizontally. This allows the assembly to be stored in either a vertical or horizontal configuration.

The lower frame member 20 comprises two parallel elongate beams 21, 22 that have their ends connected to beams 23, 24 that respectively constitute the feet of the rack. The ends of each foot 23, 24 have a castor wheel 25 clipped into an aperture on the underside of the beam so that, as shown in the drawings, the whole rack is readily movable about the castor wheels 25 that are free to rotate through 360° about a vertical axis. Each foot 23, 24 of the lower frame member 20 has an upstanding lug 26 which is adapted to fit into the end of an open rectangular beam that constitutes the vertical column 30.

The upper frame member 40 has beams 41, 42 that form the arms and support for the corrugated rods 50. As shown in FIG. 5B each arm includes a centrally positioned location block 43 that is secured to the underside of the beam 41 or 42 by a pair of spaced rivets 44, 45 that extend through the beam. The location block 43 is arranged to be a sliding fit into the upper end of the vertical column 30 and a grub screw 46 extends through the column and into the block to secure the assembly together.

As shown in FIG. 4C the connection of the corrugated rod 50 onto the beams or side arms 41, 42 is by means of an insert 60 that has a corrugated outer periphery 61 so that it is a smooth sliding fit within the internal corrugated surface of the rod 50. The interface between the corrugations 51 prevents relative axial rotation of the insert 60 in the rods 50. The projecting cylindrical end 62 of the insert 60 is stepped down to extend through an aperture 63 in the walls of the beam 42 and there is a further stepped down shank 64 that extends through a smaller aperture 66 in the outer wall. The material is then compressed by a riveting technique to provide a riveted head 67 which rests against the outer surface of the beam 42 to prevent removal of the insert 60 from the beams. Thus the location of the corrugated rods 50 on each beam 41, 42 effectively fixes the rods in a firm and substantially rigid connection to the beams that constitute the upper frame member 40.

FIG. 3 illustrates the corrugated nature of each rod 50. The corrugations 51 are elongate and define an air space between the clothing and the rod to improve ventilation and thus the drying function. The air space also ensures against the build up of moisture that might cause corrosion on the exterior surface of the rods 50. The facility to allow air to be in close vicinity to the contact points to the clothes on the rods improves the drying feature and reduces the likelihood of staining by dampness or corrosion.

The component parts of the clothing rack 10 described above are preferably constructed from aluminium. The frame members 20, 40 are rectangular cross-sectional aluminium tubing and the corrugated rods 50 would be extruded in aluminium. It is however understood that the components of the clothing rack 10 could be manufactured from other materials such as plastics or steel or even wood. The vertical columns 30 are secured to the upper and lower frames 40, 20 by use of grub screws that extend through the wall of the column to threadedly engage the location flange or lug on which the column locates. Thus to disassemble the unit it is a simple matter to simply remove the grub screws and pull the upper and lower frames 40, 20 from the vertical columns 30. Fold down the columns as shown in FIG. 2*a* and place the upper frame 40 on the lower frame 20 to assume the flattened configuration as shown in FIG. 2*b*. The absence of welds gives the rack a cleaner image which is considered visually attractive.

The corrugation of the rods 50 also increases the overall strength of the rods and provides the clothing rack 10 with increased rigidity.

The claims defining the invention are as follows:

1. A clothing rack for drying clothing comprising a free standing frame that supports a plurality of rods from which clothing can be suspended, wherein each rod has an exterior comprising a plurality of axially extending corrugations to facilitate passage of air between the clothing and the rod by defining an air space between the clothing and the rod, wherein the frame includes a base frame and an upper frame joined by columns, wherein the upper frame comprises a pair of arms connected across the opposite ends of a plurality of mutually parallel rods, wherein each end of each rod is connected to the respective arm by an insert located within the adjacent end of the rod and fastened to the arm, and wherein the interior of each rod and the exterior of the insert are correspondingly corrugated.

2. The clothing rack according to claim 1, wherein the base frame and the upper frame are dismountable from the columns for storage.

3. The clothing rack according to claim 2 wherein the base frame is supported by castor wheels.

4. The clothing rack according to claim 1 wherein the insert is riveted to the arm.

5. The clothing rack according to claim 1, wherein columns are attached to the upper and base frames by locating the ends of the columns on lugs projecting from the upper and base frames and using grub screws to hold the columns to the lugs.

6. The clothing rack according to claim 5, wherein the frames and rods are manufactured in aluminum.

7. A clothing rack according to claim 6, wherein the lugs of the upper frame are bolted to the frame.

* * * * *